(No Model.)
W. W. WALLACE.
FRICTION CLUTCH PULLEY.
No. 516,882. Patented Mar. 20, 1894.
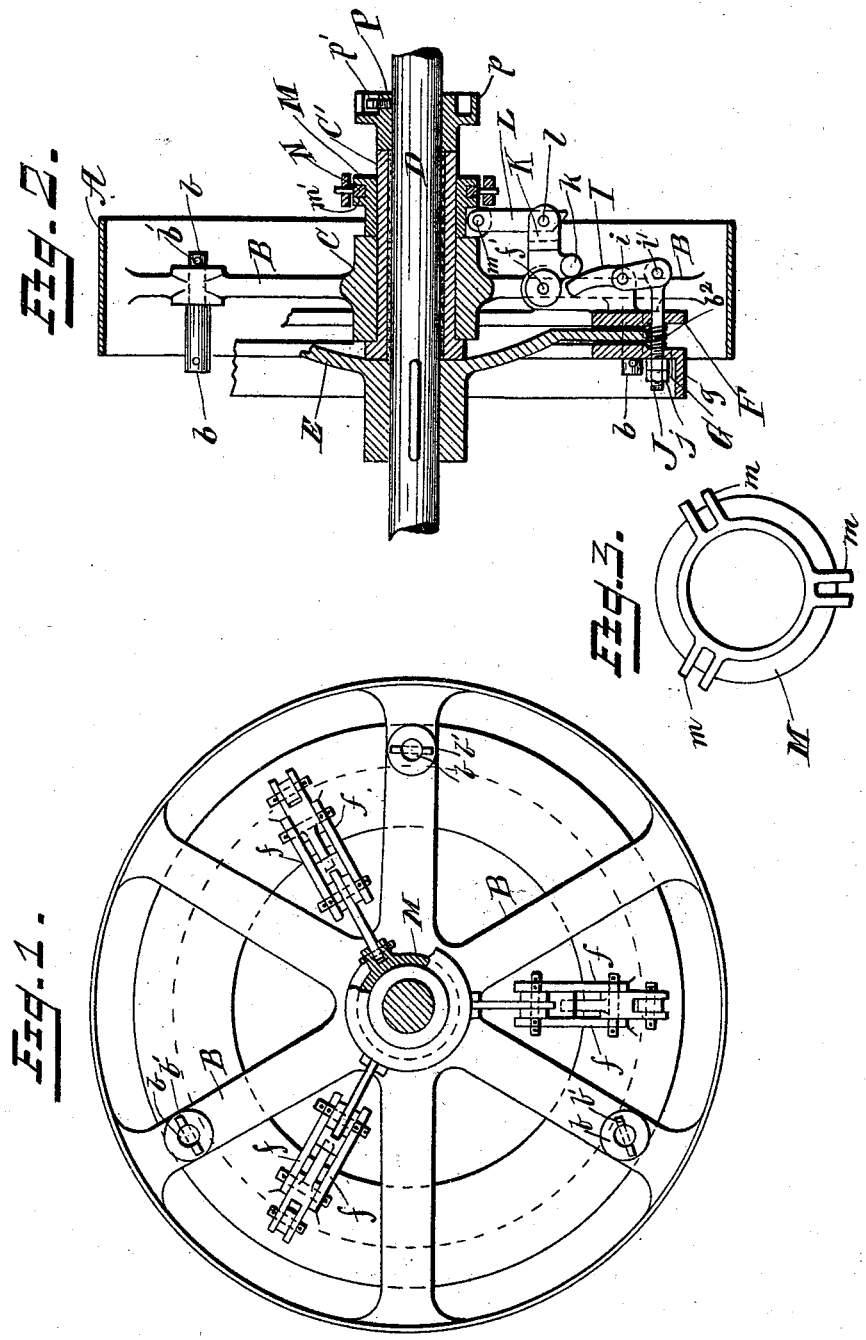
WITNESSES:
J. A. Synch
Jennie Duffill
INVENTOR
William W. Wallace
ATTY Go. W. King
THE NATIONAL LITHOGRAPHING COMPANY,
WASHINGTON, D. C.

UNITED STATES PATENT OFFICE.

WILLIAM W. WALLACE, OF WILLOUGHBY, OHIO, ASSIGNOR TO J. W. PENFIELD & SON, OF SAME PLACE.

FRICTION-CLUTCH PULLEY.

SPECIFICATION forming part of Letters Patent No. 516,882, dated March 20, 1894.

Application filed June 1, 1893. Serial No. 476,212. (No model.)

*To all whom it may concern:*

Be it known that I, WILLIAM W. WALLACE, of Willoughby, in the county of Lake and State of Ohio, have invented certain new and useful Improvements in Friction-Clutch Pulleys; and I do hereby declare the following to be a full, clear, and exact description of the invention, such as will enable others skilled in the art to which it pertains to make and use the same.

My invention relates to improvements in friction clutch pulleys, wherein the mechanism for operating the clutch is, in the main, mounted on and located inside the pulley, and hence this mechanism only revolves when the pulley revolves, and consequently this clutch mechanism can be adjusted, oiled and cared for without stopping the shafting.

My invention also relates to the detail of construction hereinafter described and pointed out in the claims.

In the accompanying drawings, Figure 1 is a side elevation of a friction clutch pulley embodying my invention. Fig. 2 is an elevation of the same in central section, taken at right angles to the view in Fig. 1. Fig. 3 is a plan in detail of collar M.

A represents the rim of the pulley, B the arms and C the hub thereof, this pulley being mounted loose on shaft D. The hub of the pulley is bored large enough to receive the sleeve C' with a driving fit. The sleeve is long and is bored to fit the shaft loosely. This sleeve can be removed and a new sleeve inserted whenever such change may be found necessary from wear of the parts. It is good practice to construct the sleeve of some anti-friction metal, such as by reason of the cost could hardly be afforded for the whole pulley.

E is what for convenience we will call the friction disk, although in reality it is usually a spider with a flat rim, member E being mounted rigidly on the shaft at the one end of the pulley. Two or more of these arms B are bored laterally to receive, respectively, steady pins $b\ b$. Usually these pins $b$ are reduced in size where they enter the holes in the arms, so that there are shoulders of these pins to engage the outer faces of these arms. Pins $b$ are inserted usually with a driving fit and are further secured by lateral pins $b'$.

F and G are flat rings that are mounted on pins $b$, these rings having lateral holes that fit easily over the pins. Ring F is located between the pulley and member E while ring G is located next outside of member E and by clamping the latter between rings F and G the frictional force is generated for driving the pulley. There are springs $b^3$ coiled around bolts J, these springs being located between the rings F and G. When these rings are drawn toward each other to clamp the friction disk, these springs are thereby compressed and the recoil of these springs forces the rings apart so that normally they do not engage the friction disk. It will be observed that the diameter of member E is such that it comes within the line of pins $b$, while the depth of rings F and G is such that these rings overlap member E for some distance for frictional engagement. I will here remark that the metal faces of member E are used for the purpose but the opposing faces of rings F and G are preferably lined with plates of vulcanized hard wood fiber. These plates or sheets of fiber are riveted on and may be renewed as often as necessary. The inner disk F on the face thereof next the pulley is provided with laterally projecting ears, or flanges $f$ arranged in pairs as shown more clearly in Fig. 1. Between each pair of ears is located a lever I the same being fulcrumed to the ears at $i$. The short arm of each lever I is pivotally connected at $i'$ with an eye bolt J, bolts J extending with easy fits through holes in rings F and G, each bolt being provided with jam nuts as at $j$ located next outside of ring G. By adjusting these nuts may be regulated the pressure of these rings against the intervening friction disk E. Located between each pair of ears $f$ and fulcrumed thereto at $f'$ is an angular lever K. Each lever K has a lug or projection $k$ at the elbows thereof, for engaging the outer face of the free end of the opposing lever I. The other end of each lever K is pivoted at 1 to a link L, these links serving as toggle arms. The other ends of links L operate between, and are pivoted to ears $m$ of collar M. This collar is mounted loosely on sleeve C' aforesaid. Collar M has an annular groove $m'$ in which groove operates the split ring N. The latter has trunnions $n$ for engaging the prongs of a forked hand lever, not shown, that is supposed to be hinged to the ceiling above and to extend down within reach of the operator. When collar M is moved toward the right hand, relative to Fig. 2, links L are thereby inclined and operate levers K in the direction to allow the clutch to open. When collar M is moved toward the left hand until the links are perpendicular to the line of the shaft, the parts will maintain such position without fastening and in such position of parts the clutch will be closed, that is to say the friction disk E will be clamped between rings F and G thereby causing the pulley to revolve with disk E. It will be observed that ring G has a flange g, this flange projecting beyond the line of pins b, so that if the belt should fly off the pulley, this rim g will prevent the belt from colliding with pins b. Also the collar P that holds sleeve C' endwise in the one direction, this collar has a rim p that projects over and protects the set screw p' that fastens the collar on the shaft and hence, this set screw does not menace the belt, or anything else, for that matter. I will again call attention to the important fact that, when the friction clutch is open, not only the pulley stops, but also stops all the mechanism for operating the clutch and the only member that continues to revolve with the shaft is the friction disk E. Hence, when the pulley is at rest, all of the aforesaid mechanism for operating the clutch can be adjusted, cleaned, oiled or repaired without stopping the shaft. This is a matter of great importance, as in a large factory where there are likely to be many friction clutch pulleys in use, it would be a serious matter to be obliged to shut down every time one of these pulleys needed attention. Even nut j that regulates the frictional force of the clutch can be manipulated just as well when the shaft is running, and, owing to the wear of the friction surfaces such adjustment may be required at any time.

What I claim is—

1. In combination with a loose pulley having pins projecting laterally from the arms of said pulley, friction rings mounted on said pins, a friction disk rigidly mounted on the shaft and located between such friction rings, and mechanism for causing the friction rings to grasp or release the disk, substantially as and for the purpose set forth.

2. In combination with a loose pulley having pins projecting laterally from the arms of said pulley, friction rings mounted on the pins, bolts between said rings, and coiled springs on said bolts and adapted to force the rings apart, levers for drawing the rings toward each other, such levers being mounted on one of the friction rings and located inside of the pulley, and a friction disk rigidly mounted on the shaft and located between the friction rings, substantially as and for the purpose set forth.

3. The combination with a loose pulley, having pins projecting laterally from the arms of the pulley, friction rings mounted on such pins, the outer friction ring having a peripheral rim projecting beyond and outside of the said pins, a friction disk rigid on the shaft and operating between the friction rings and mechanism for operating the friction rings in grasping or releasing the friction disk, substantially as and for the purpose set forth.

4. In combination, a friction clutch pulley having pins projecting laterally from the arms of the same, friction rings connected by said pins to the pulley, a friction disk secured rigidly to the shaft and operating between the said rings for driving purposes, and mechanism for causing the friction rings to grasp or release the disk, substantially as described and for the purpose set forth.

In testimony whereof I sign this specification, in the presence of two witnesses, this 27th day of May, 1893.

WILLIAM W. WALLACE.

Witnesses:
R. C. PENFIELD,
CHAS. HORTON.